US009480959B2

(12) United States Patent
Ring et al.

(10) Patent No.: US 9,480,959 B2
(45) Date of Patent: Nov. 1, 2016

(54) PROCESS AND APPARATUS FOR CONVERSION OF SILICON TETRACHLORIDE TO TRICHLOROSILANE

(75) Inventors: Robert Ring, Haiming (DE); Noemi Banos, Nuremberg (DE); Uwe Paetzold, Burghausen (DE)

(73) Assignee: Wacker Chemie AG, Munich (DE)

( * ) Notice: Subject to any disclaimer, the term of this patent is extended or adjusted under 35 U.S.C. 154(b) by 424 days.

(21) Appl. No.: 13/979,268

(22) PCT Filed: Jan. 16, 2012

(86) PCT No.: PCT/EP2012/050546
§ 371 (c)(1),
(2), (4) Date: Jul. 11, 2013

(87) PCT Pub. No.: WO2012/098069
PCT Pub. Date: Jul. 26, 2012

(65) Prior Publication Data
US 2013/0287668 A1    Oct. 31, 2013

(30) Foreign Application Priority Data

Jan. 17, 2011   (DE) .................. 10 2011 002 749

(51) Int. Cl.
*C01B 33/08*    (2006.01)
*B01J 12/00*    (2006.01)
(Continued)

(52) U.S. Cl.
CPC ............. *B01J 12/00* (2013.01); *C01B 33/04* (2013.01); *C01B 33/1071* (2013.01); *Y02P 20/129* (2015.11)

(58) Field of Classification Search
None
See application file for complete search history.

(56) References Cited

U.S. PATENT DOCUMENTS 4,217,334 A * 8/1980 Weigert ................ C01B 33/107
423/342
4,536,642 A    8/1985 Hamster et al.
(Continued)

FOREIGN PATENT DOCUMENTS

CN    EP 2179965 A1 *  4/2010 ............ C01B 33/03
DE           3024320 A1     4/1982
(Continued)

OTHER PUBLICATIONS

International Search Report for PCT/EP2012/050546 dated Apr. 23, 2012.

*Primary Examiner* — Jennifer A Smith
*Assistant Examiner* — Anita Nassiri Motlagh
(74) *Attorney, Agent, or Firm* — Caesar Rivise, PC

(57) ABSTRACT

A process for hydrogenating chlorosilanes in a reactor, wherein at least two reactant gas streams are introduced separately from one another into a reaction zone, wherein the first reactant gas stream comprising silicon tetrachloride is conducted via a first heat exchanger unit in which it is heated and is then conducted through a heating unit which heats it to a first temperature before the first reactant gas stream reaches the reaction zone, and wherein the second reactant gas stream comprising hydrogen is heated by a second heat exchanger unit to a second temperature, wherein the first temperature is greater than the second temperature, and then introduced into the reaction zone, such that the mixing temperature of the two reactant gas streams in the reaction zone is between 850° C. and 1300° C., and said reactant gas streams react to give product gases comprising trichlorosilane and hydrogen chloride, wherein the product gases obtained in the reaction are conducted through said at least two heat exchanger units and preheat the reactant gas streams of the reaction by the countercurrent principle, wherein the flow passes first through the first heat exchanger unit and then through the second heat exchanger unit. A reactor for hydrogenating chlorosilanes, comprising two gas inlet devices through which reactant gases can be introduced separately from one another into the reactor, and at least one gas outlet device through which a product gas stream can be conducted, at least two heat exchanger units which are connected to one another and which are suitable for heating reactant gases separately from one another by means of the product gases conducted through the heat exchanger units, and a heating zone which is arranged between a first heat exchanger unit and a reaction zone and in which there is at least one heating element.

6 Claims, 2 Drawing Sheets

Figure 1:
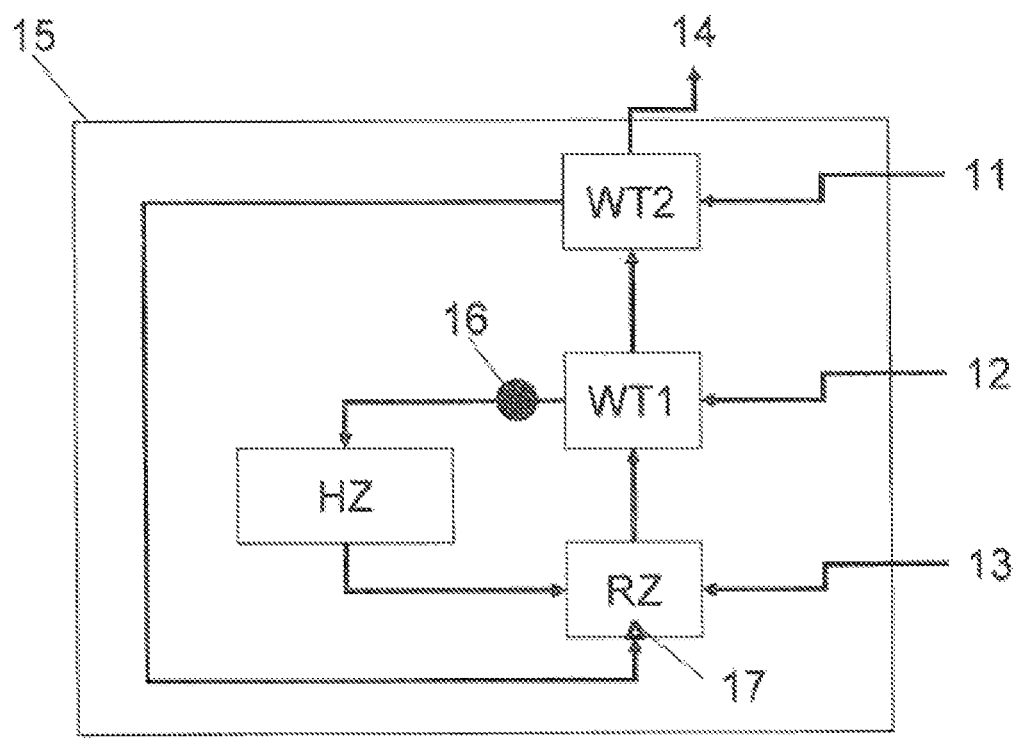

(51) Int. Cl.
*C01B 33/107* (2006.01)
*C01B 33/04* (2006.01)

(56) References Cited

U.S. PATENT DOCUMENTS

| | | | |
|---|---|---|---|
| 5,422,088 A | 6/1995 | Burgie et al. | |
| 2007/0073075 A1 | 3/2007 | Paetzold et al. | |
| 2008/0112875 A1 | 5/2008 | Garcia-Alonso et al. | |
| 2009/0060819 A1 | 3/2009 | Bill, Jr. | |
| 2009/0112875 A1* | 4/2009 | Maes | G06F 17/30575 |
| 2010/0008842 A1 | 1/2010 | Pfluegler et al. | |
| 2013/0078176 A1 | 3/2013 | Bieker | |
| 2013/0095026 A1 | 4/2013 | Oenal et al. | |

FOREIGN PATENT DOCUMENTS

| | | |
|---|---|---|
| DE | 19502550 A1 | 8/1995 |
| DE | 102005005044 A1 | 8/2006 |
| DE | 102005046703 A1 | 4/2007 |
| DE | 102006050329 B3 | 12/2007 |
| DE | 112008002299 T5 | 7/2010 |
| EP | 1454670 A1 | 9/2004 |
| EP | 2000434 A2 | 12/2008 |
| EP | 2008969 A1 | 12/2008 |
| WO | 03073794 A1 | 9/2003 |
| WO | 2011085896 A2 | 7/2011 |
| WO | 2011085902 A1 | 7/2011 |

* cited by examiner

PROCESS AND APPARATUS FOR CONVERSION OF SILICON TETRACHLORIDE TO TRICHLOROSILANE

BACKGROUND OF THE INVENTION

The invention provides a process and an apparatus for conversion of silicon tetrachloride to trichlorosilane.

Trichlorosilane is used for production of poly-crystalline silicon.

Trichlorosilane is typically prepared in a fluidized bed process from metallurgical silicon and hydrogen chloride. In order to obtain high purity trichloro-silane, this is typically followed by a distillation. This also affords silicon tetrachloride as a by-product.

The majority of silicon tetrachloride is obtained in the course of deposition of polycrystalline silicon. Polycrystalline silicon is obtained, for example, by means of the Siemens process. This involves depositing silicon on heated thin rods in a reactor. The process gas used as the silicon-containing component is a halosilane such as trichlorosilane in the presence of hydrogen. The conversion of trichlorosilane (disproportionation) to deposited silicon gives rise to large amounts of silicon tetrachloride.

Silicon tetrachloride can be used, for example, to produce finely divided silica by reaction with hydrogen and oxygen at high temperatures in combustion chambers.

However, the use of greatest economic interest for silicon tetrachloride is conversion to trichlorosilane. This is accomplished by reaction of silicon tetra-chloride with hydrogen to give trichlorosilane and hydrogen chloride. This makes it possible to obtain trichlorosilane from the silicon tetrachloride by-product formed in the deposition, and to feed that trichlorosilane back to the deposition process, in order to obtain elemental silicon.

The conversion of silicon tetrachloride with hydrogen to give trichlorosilane typically takes place in a reactor at high temperatures, at at least 600° C., ideally at at least 850° C. (high-temperature conversion).

For reasons of energy saving, the reactants in the reaction (silicon tetrachloride and hydrogen) are typically heated with the aid of the hot offgases of the reactor (products and residues of the reactants, i.e. essentially trichlorosilane, hydrogen chloride, silicon tetrachloride and hydrogen).

The patent DE 30 24 320 C2 claims a corresponding apparatus for conversion of silicon tetrachloride to trichlorosilane using a heat exchanger unit. The heat exchanger unit may consist, for example, of a set of electrically unheated graphite tubes which serve as a gas outlet, around which fresh gas flows on the outside by the countercurrent principle.

Reactors for the hydrogenation of silicon tetrachloride with hydrogen must be able to withstand high temperatures and the corrosive nature of materials such as chlorosilanes and hydrogen chloride gas, which is formed during the hydrogenation process. Therefore, carbon-based materials, including carbon, graphite, carbon fiber composite materials and the like, are typically used within the reactor.

DE 195 02 550 A1 discloses a process for hydrogenation of silicon tetrachloride, where the process comprises contacting hydrogen gas and silicon tetrachloride at a temperature greater than 600° C. in a reactor comprising a pressurizable shell having located therein a reaction vessel forming a substantially closed inner chamber for contacting the hydrogen gas with silicon tetrachloride, wherein an outer chamber is arranged between the pressurizable shell and the reaction vessel, the outer chamber having located therein and adjacent to the shell a carbon or graphite insulation layer and between the insulation layer and the reaction vessel one or more heating elements, wherein a gas or a gaseous mixture having a chlorine to silicon molar ratio greater than 3.5 is fed to the outer chamber.

The gas fed to the outer chamber may be silicon tetrachloride or a mixture of silicon tetrachloride with trichlorosilane, dichlorosilane or chlorosilane. The gaseous mixture fed to the outer chamber may also comprise chlorine, hydrogen chloride or a mixture thereof, and one or more silanes selected from the group of silicon tetrachloride, trichlorosilane, dichlorosilane and chlorosilane.

At high temperatures, graphite reacts with hydrogen to give methane (=methanization). This leads to structural defects in the reactor and ultimately to reactor shutdowns and a reduction in service life. Since defective parts have to be replaced and new parts have to be installed, this is also associated with a considerable level of financial investment.

The methanization occurs especially in the heaters which come into direct contact with hydrogen and silicon tetrachloride. In addition, the countercurrent heat exchangers, especially in the range of relatively high temperatures, especially in the region of the offgases, can also be damaged by the reaction of hydrogen and graphite to give methane. Particularly heating elements manufactured from graphite exhibit the greatest propensity to corrosion, since hydrogen (mixed with silicon tetrachloride) meets very hot surfaces here. Damage in the heaters is highly likely to lead to a shutdown of the converter reactor, since the heaters are designed as resistance heaters.

Since graphite is pervious to hydrogen and silicon tetrachloride due to its porosity, hydrogen and silicon tetrachloride can diffuse from the reactant side to the product side in the heat exchanger. This reduces the selectivity of the overall process, since not all reactants are conducted completely through the converter.

The reactant stream which diffuses to the product side does not reach the reaction zone, the result of which is that no conversion of silicon tetrachloride to trichlorosilane takes place. In addition, the product stream coming from the reaction zone is diluted, which is disadvantageous.

If the procedure of DE 195 02 550 A1 is followed, the heating elements are not in contact with hot hydrogen. There can therefore be no corrosion in this region. Damaging effects of hydrogen gas outside the reaction zone can be avoided.

However, the tubes which form the inner zone and define the outer zone can be corroded by the incoming hydrogen, which leads to reactor shutdowns in the long term.

Moreover, it has been found that, in the presence of dichlorosilane, there is deposition of silicon in the two tubes. This leads to a deterioration in heat transfer. In order to compensate for this, the heating output has to be increased further, which would have an adverse effect on energy balance.

EP 2 008 969 A1 describes a reactor for conversion of silicon tetrachloride, in which protective gas is used to prevent any leaks of process gases which occur. This involves conducting argon into an outer vessel, while no argon is present within the reaction vessel. This protects the heaters from hydrogen and other process gases.

EP 2 000 434 A2 also proposes an apparatus for conversion of silicon tetrachloride, in which the heaters are arranged separately from the reaction space. The space between reaction zone and outer vessel is supplied with argon under elevated pressure, in order to prevent leaks to the outside. Here too, the heaters are not in direct contact with hot hydrogen. Corrosion of the heaters is thus avoided. However, the heat exchangers are exposed to the hydrogen without protection.

The disadvantage of these methods is that the greater distance of the heaters from the product stream results in a much higher heater temperature being required. This higher temperature results in damage to the electrical bushing. Moreover, it causes a higher level of complexity for insulation of the heating space in the outward direction from the pressurized shell. Furthermore, this need for additional insulation increases the diameter of the plant. The heating space also has to be provided with complex pressure regulation which ensures that the pressure in the heating space is always somewhat greater than in the product space, in order that the hydrogen in particular cannot penetrate into the heating space.

However, the pressure in the heating space must also not be too great because the product chamber, which is exposed to extreme temperatures due to the heaters, is otherwise additionally stressed with elevated pressure and can therefore be damaged. Moreover, the lack of heaters in the reaction space results in loss of heat exchanger surfaces, which have to be additionally introduced, making the reactor even larger.

If the boundary shell of the heating space is slightly damaged, for example by chemical attack, the gas in the heating space flows into the product space as a result of the elevated pressure. This firstly means a corresponding loss of the gas in the heating space. Secondly, the product gases are contaminated by the incoming gas, which can have an adverse effect, especially for the downstream processes.

In principle, it is also possible to introduce the power into the product space not via radiation, but rather via induction. The disadvantages of this variant are likewise the complex pressure regulation and the greater diameter required for the plant. Moreover, insulation would have to be introduced between product space and heating space in order to protect the induction coil in the heating space from impermissibly high temperatures. In addition, the induction coil would have to be cooled, which leads to heat losses and hence reduces the efficiency of the reactor.

The patent DE 10 2006 050 329 B3 describes a high-pressure process for conversion of silicon tetrachloride to trichlorosilane. The conversion has to be effected at a supercritical pressure of the reactant gases. The system pressure of the product stream is preferably kept within the subcritical range. This is achieved by a decompression downstream of the reaction zone. Here too, it is found, however, that the heating elements and heat exchangers are corroded by hydrogen.

In the prior art, efforts have been made to coat the graphite parts used with suitable materials in order to achieve the effect that hydrogen can react only to a reduced degree, if at all, with the surface of the parts.

DE 10 2005 046 703 A1 proposes, for example, coating the surface of the reaction chamber and the surface of the heating element in situ with silicon carbide before the hydrogenation of the chlorosilane, and thus reducing methanization of these components. This step of coating with silicon carbide takes place at a temperature of at least 1000° C.

Nevertheless, in the case of coated graphite parts too, methanization and associated corrosion are always still to be expected.

In addition, it is also necessary to coat the heat exchangers—especially the hottest parts—which means a not inconsiderable financial investment, especially since consumables are still involved. Manufacture of the heat exchangers completely from SiC would also be conceivable, but this firstly likewise means an enormous financial investment, and manufacture of relatively large components from SiC or comparable ceramic materials, as actually required in production plants, is secondly possible only with very great difficulty, if at all.

DE 10 2005 005 044 A1 describes a process for conversion of silicon tetrachloride to trichlorosilane, in which the cooling rate of the process gas in the heat exchanger is controlled. For the heat exchangers, preference is given to using materials such as silicon carbide, silicon nitride, quartz glass, graphite, or silicon carbide-coated graphite.

However, the construction complexity is comparatively high and the use of such heat exchangers is thus relatively expensive.

DE 11 2008 002 299 T5 proposes purifying "dirty" trichlorosilane comprising dichlorosilane from crude trichlorosilane production, and then reacting it with silicon tetrachloride to give trichlorosilane.

If dichlorosilane is used as an additional component of the reactants in the conversion, however, additional continuous coating of the graphite parts like the heat exchanger is observed. This coating, which grows with time, alters the heat transfer and therefore has adverse effects on the energy demand. Moreover, the coating has adverse effects on the structural integrity of the components, especially the heating elements.

As a result of the dichlorosilane deposition reaction, which already takes place before entry of the dichlorosilane into the actual reaction space of the reactor, only a small amount of dichlorosilane remains to react with silicon tetrachloride. The increase in trichlorosilane yield is therefore in reality much lower than first expected.

This problem of dichlorosilane deposition exists in all processes and reactors known in the prior art when dichlorosilane is present in the reactant stream.

This problem gave rise to the objective of the present invention, that of providing a process and an apparatus suitable for performance of the process, which prevents methanization of components and, in the case of use of dichlorosilane, prevents deposition on the components and simultaneously increases the yield of trichlorosilane.

DESCRIPTION OF THE INVENTION

The object of the invention is achieved by a process for hydrogenating chlorosilanes in a reactor, wherein at least two reactant gas streams are introduced separately from one another into a reaction zone, wherein the first reactant gas stream comprising silicon tetrachloride is conducted through a first heat exchanger unit in which it is heated and is then conducted through a heating unit which heats it to a first temperature before the first reactant gas stream reaches the reaction zone, and wherein the second reactant gas stream comprising hydrogen is heated by a second heat exchanger unit to a second temperature, wherein the first temperature is greater than the second temperature, and then introduced into the reaction zone, such that the mean gas temperature in the reaction zone is between 850° C. and 1300° C., and said reactant gas streams react to give product gases comprising trichlorosilane and hydrogen chloride, wherein the product gases obtained in the reaction are conducted through said at least two heat exchanger units and preheat the reactant gas streams of the reaction by the countercurrent principle, wherein the flow passes first through the first heat exchanger unit and then through the second heat exchanger unit.

The object is likewise achieved by a reactor for hydrogenating chlorosilanes, comprising two gas inlet devices through which reactant gases can be introduced separately from one another into the reactor, and at least one gas outlet device through which a product gas stream can be conducted, at least two heat exchanger units which are connected to one another and which are suitable for heating reactant gases separately from one another by means of the product gases conducted through the heat exchanger units, and a heating zone which is arranged between a first heat exchanger unit and a reaction zone and in which there is at least one heating element.

The reaction zone is preferably provided with an additional gas inlet which is arranged such that incoming gas cannot come into contact with the heating elements. This gas inlet is preferably in the center of the lower boundary surface of the reaction chamber and is provided with at least one nozzle.

The object is likewise achieved by a reactor for hydrogenating chlorosilanes, comprising a vessel which comprises a casing, a lower end and an upper end opposite the lower end, and at least one inlet device for a reactant gas stream and at least one outlet device for a product gas stream, at least one circular heating element or several heating elements arranged in a circle, at least four cylindrical deflecting devices for gas which are arranged concentrically in the vessel, suitable for deflecting gas flowing at the upper or lower end of the reactor, the radius of a first cylindrical deflecting device being greater and the radius of the at least three further deflecting devices being less than the radius of the circular heating element or less than the radius of the circle on which the heating elements are arranged, at least one further inlet device for a reactant gas which comprises nozzles mounted in a circle on the lower end of the vessel, the radius of the circle on which the nozzles are arranged being greater than the radius of one of the deflecting devices and less than the radius of any deflecting device adjacent to that deflecting device.

The process according to the invention makes it possible to separate hydrogen and silicon tetrachloride from one another as they flow in on the reactant side. Silicon tetrachloride can additionally be heated to a temperature of more than 1300° C. with the aid of an electrically heated heating element in a heating zone without the presence of hydrogen, there being no corrosion of the heating element. No chemical reactions take place in the heating zone, since only gases inert to the temperature region are supplied. The two reactant streams do not mix until within the reaction zone, the desired mixing temperature is established, and the reactant streams react to give the desired products without any additional heating.

More preferably, the pressure of the reactant gas stream in the first heat exchanger unit is set 10 to 1000 mbar higher than the pressure of the product gas stream as it flows through the first heat exchanger unit.

This pressure differential generates a diffusion volume flow between the reactant and product sides of the heat exchanger and can be adjusted by means of a throttle (16).

In a conventional reactor, the reactants ($H_2$ and silicon tetrachloride) are introduced together into an insulated vessel through an orifice to the heat exchangers. The hot offgas of the reaction (trichlorosilane, silicon tetrachloride, HCl and $H_2$) heats the reactants virtually to the desired end temperature in a cross-countercurrent process. In the reaction space, the reactants are additionally conducted along the heating elements in order thus to obtain the temperature needed for the reaction.

A simplified reaction equation is:

$$SiCl_4 + H_2 \rightarrow SiHCl_3 + HCl$$

Through an orifice, the product gas thus obtained, comprising $SiHCl_3$+HCl, flows through the heat exchanger(s) made of graphite and leaves the reactor via a further orifice.

However, the disadvantages described above are exhibited (methanization, corrosion, investment, costs).

It order to achieve separation of the reactants (essentially hydrogen and silicon tetrachloride), at least two separate heat exchanger units are used in accordance with the invention, in which case one or more are more preferably manufactured from graphite and at least one from steel.

The hot product stream preferably first heats the heat exchanger manufactured from graphite and then the heat exchanger preferably manufactured from steel.

FIG. 1 shows a schematic of the inventive apparatus.

In the "hotter" heat exchanger WT1, which immediately follows the reaction zone 13, the reactant gas stream 12 comprising silicon tetrachloride is heated by the offgas of the reaction zone (RZ).

Heat exchanger WT1 consists of graphite, of silicon carbide, or of silicon carbide-coated graphite. An optional but particularly preferred throttle 16, which may consist, for example, of a constriction in a pipeline, of the incorporation of a suitable valve, or of the smaller design of the diameter of the pipelines used, ensures a defined pressure differential between the outlet of the heat exchanger WT1 and the heating zone HZ. In the heating zone, the reactant gas stream 12 is conducted along heating elements, such that the temperature is increased. The heating elements may preferably be designed as described in DE 10 2005 046 703 A1. The temperature attained must be higher than that required for the reaction. This reactant gas stream 12 which has thus been heated and reduced in pressure is introduced into the reaction zone of the reactor.

According to the invention, the hydrogen reactant gas is not part of reactant gas stream 12, the result of which is that corrosion of the graphite by methanization is ruled out on the part of the reactants. Hydrogen may nevertheless be a small proportion of reactant gas stream 12 if it is ensured that the concentration is lower than that which is just tolerable for the methanization of graphite.

The reactant gas stream 11 is heated by means of the "colder" heat exchanger unit WT2, which preferably consists of steel or stainless steel, adjoins the heat exchanger unit WT1 and is exposed to the already somewhat colder product gas. The reactant gas stream 11, after heating in heat exchanger unit WT2, is introduced into the reaction zone via one or more nozzles 17. The temperature of the reactant gas stream 11 after heating in heat exchanger unit WT2 is lower than the temperature required for the reaction.

The reactant gas stream 11 comprises the hydrogen which is needed for the reaction in RZ.

The use of steel or stainless steel for the heat exchanger unit WT2 instead of graphite or coated graphite, as is conventional, is advantageous since hydrogen does not come into contact with graphite as a result of the seal in the steel heat exchanger, and hence no corrosion can occur. This is especially because no diffusion of hydrogen takes place through the gas-tight steel. It is thus impossible that hydrogen could get to graphite parts upstream of the reaction chamber. Finally, any yield losses are also prevented by diffusion of hydrogen.

Since the product stream in the heat exchanger unit WT1 has already been cooled sufficiently, the use of steel for heat exchanger unit WT2 is unobjectionable from a process technology point of view.

For reasons of space-time yield, the conversion reactor is operated in the elevated pressure range.

The individual reactant streams and also the product stream therefore also have elevated pressure.

It is therefore advantageous that the heat exchangers, especially the (stainless) steel heat exchanger, are arranged in the pressurized shell of the reactor 15, since the heat exchangers need then only have a low mechanical strength and any possible slightly leaky site on the heat exchangers cannot mean any escape of product or even a safety risk.

Figure 2:
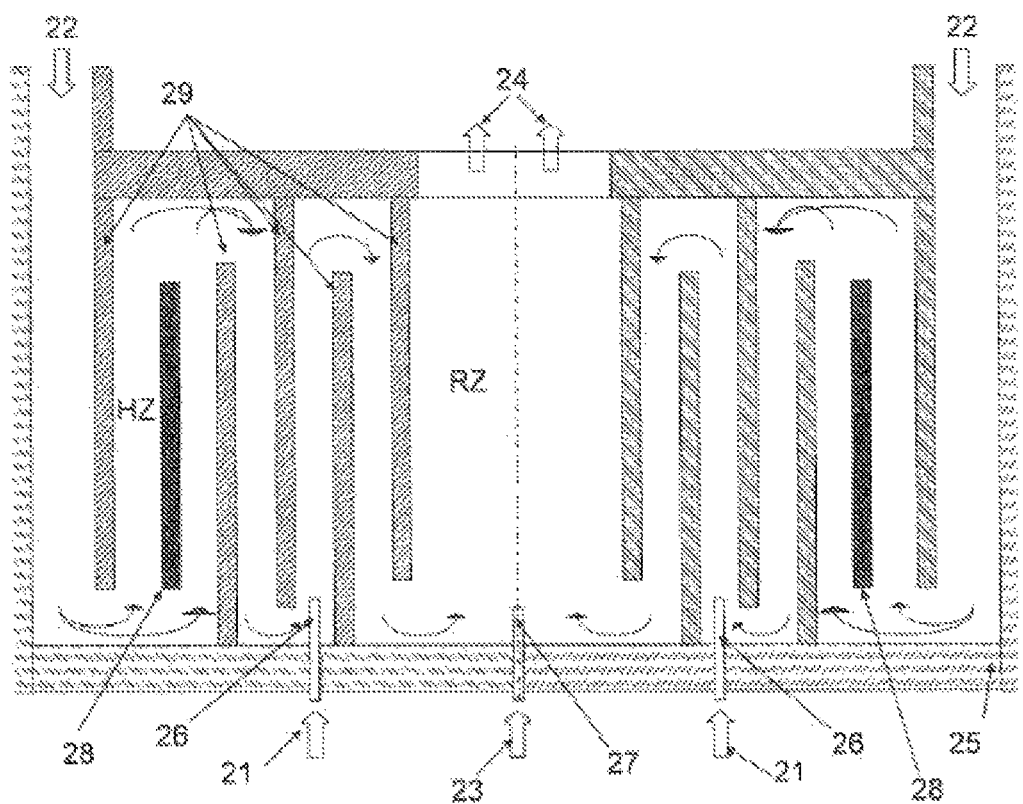

FIG. 2 shows a more detailed outline view of the heating and reaction zone.

The reactant stream comprising silicon tetrachloride 22 is conducted, along the inner wall of the pressure-resistant housing 25, after passing a first cylindrical deflecting element 29, to the heating zone in which there is at least one actively heated heating element 28. For example, this heating element can be designed in the form of electrical resistance heating, but inductive heating methods are also conceivable.

The heating elements may be distributed individually over the radius, or it may also consist of a zig-zagging heating band which forms a complete ring, or consist of several zig-zag heating ring components. A more detailed description of a zig-zagging heating element is given in patent WO 03/073794 A1.

A cylindrical deflecting element may consist, without restriction thereto, for example, of a simple hollow cylinder made of graphite. A deflecting element causes a change in the main flow direction of the gas by 180°.

Said reactant stream is conducted along said heating elements and thus heated to a higher temperature. Thereafter, the reactant stream passes a second cylindrical deflecting element 29. Only after passing a third deflecting element 29 is a further reactant gas stream 21 comprising hydrogen added via a nozzle circle 26 to the silicon tetrachloride-containing reactant stream. The reaction zone of the apparatus begins here, in which the two reactant streams mix and react to give the desired product.

After passing two further cylindrical deflecting elements 29, a further reactant gas stream 23 comprising dichlorosilane can be added to this gas stream via a nozzle 27 mounted centrally in the reaction zone. All components of the reactant gas streams can perform the desired reactions with one another here, before leaving the reaction zone in the direction of the first heat exchanger unit as product stream 24.

List of reference numerals used in Fig. 2
21 Reactant stream comprising hydrogen
22 Reactant stream comprising silicon tetrachloride
23 Reactant stream comprising dichlorosilane
24 Product stream comprising trichlorosilane and HCl
25 Inner wall of the pressure-resistant housing, comprising the lower end and the casing
26 Nozzle circle for hydrogen reactant stream
27 Nozzle for dichlorosilane reactant stream
28 Heating element
29 Cylindrical gas deflecting elements The temperature in the reaction zone (RZ) at which the chemical equilibrium of the reaction is established results from the mixing temperature of the totality of the silicon tetrachloride and hydrogen reactant streams minus the endothermic energy which is required for the reaction of silicon tetrachloride and hydrogen to give trichlorosilane and HCl.

At a given mixing temperature T in the reaction zone, the temperature of the reactant gas stream comprising silicon tetrachloride, which is to be established with the heating output of the heating elements, can be determined in adequate approximation according to the following equation:

$$\Sigma m_{reactant} c_{reactant} T_{reactant} + \Delta H_R = T \Sigma m_{product} c_{product}$$

The following abbreviations apply:

| | |
|---|---|
| T | Mixing temperature [K] |
| $m_{reactant}$ | Molar mass of the proportion of the reactant stream (silicon tetrachloride, hydrogen) |
| $c_{reactant}$ | Specific heat capacity of the proportion of the reactant (silicon tetrachloride, hydrogen) |
| $T_{reactant}$ | Temperature of the proportion of the reactant stream (silicon tetrachloride, hydrogen) [K] |
| $m_{product}$ | Molar mass of the proportion of the product stream (trichlorosilane, HCl, tetrachlorosilane, hydrogen) |
| $c_{product}$ | Specific heat capacity of the proportion of the product stream (trichlorosilane, HCl, tetrachlorosilane, hydrogen) |
| $\Delta H_R$ | Heat of reaction |

The heat of reaction $\Delta H_R$ is determined from the difference in the enthalpies of the reactants and products, as follows:

$$\Delta H_R = [H(SiHCl_3) + H(HCl)] - [H(SiCl_4) + H(H_2)]$$

The temperature in the reaction zone should be between about 850° C. and 1300° C.

The advantage of this measure is that the heating elements also do not come into contact with hot hydrogen, and so corrosion thereof can be ruled out.

In return for this, the temperature of silicon tetrachloride and hence also of the heating elements must be higher than in the reactor used to date.

The higher temperature of the heating elements is, however, still well below the maximum use temperature thereof and does not constitute a problem provided that only silicon tetrachloride flows around the heaters. More particularly, the thermal stress on the components surrounding the heating elements is low as a result of the inherent cooling by the reactant stream comprising silicon tetrachloride.

Hydrogen is known to be responsible for a multitude of corrosion mechanisms at relatively high temperatures.

By keeping the hydrogen away from the heating elements, it is also possible in principle to use other materials, for example molybdenum disilicide, silicon, silicon carbide, silicon nitride or a combination of these materials, for the heating elements.

It is likewise possible and preferable to use heating elements made of CFC (CFC=carbon fiber reinforced carbon).

Hydrogen is supplied to the reaction zone via a nozzle/nozzles suitable therefore, with the purpose of rapidly mixing hydrogen and silicon tetrachloride homogeneously in the reaction space.

A particularly preferred embodiment of the process is, in addition to the heated reactant gas streams 11 and 12, to introduce a third reactant gas stream 13 directly into the reaction zone without preheating it beforehand.

This third reactant gas stream more preferably comprises dichlorosilane.

The advantage of this method is that the third reactant gas stream does not come into contact with hot components, such as heat exchangers and/or heating elements. Particularly in the case of use of dichlorosilane, this leads to deposition of silicon on said components.

The third reactant gas stream is supplied to the reaction zone likewise via a nozzle or nozzles suitable therefore in a specific arrangement with the purpose of rapid homogeneous mixing of all reactant gas streams.

Since a reactant gas stream whose temperature is lower than that desired in the reaction zone is additionally introduced into the reaction zone, the selected temperature of silicon tetrachloride must be higher in order to obtain the desired gas temperature in the reaction zone. If the amount of the third reactant gas stream is much lower than the sum total of the two other reactant gas streams, it is also possible to dispense with another correction of the reactant gas stream comprising silicon tetrachloride, since it can be expected that the temperature will not be lowered significantly in the reaction zone.

Dichlorosilane could be supplied either to the hydrogen or to the silicon tetrachloride as early as before introduction into the reactor.

Since, however, in the course of heating of the dichlorosilane/silicon tetrachloride or dichlorosilane/hydrogen mixture in the heat exchangers, there may be reactions, for example silicon deposition, the direct feeding of the gaseous dichlorosilane into the reaction space is advantageous.

In addition to the advantage of supplying dichlorosilane obtained as a by-product back to the circulation system through the feeding into the conversion reactor, it has been found that the feeding of dichlorosilane into the conversion reactor significantly increases the selectivity of the conversion reaction.

The processes and apparatus described to date thus make it possible to prevent corrosion on the reactant side of the graphite heat exchanger and in the region of the heating elements.

However, as a result of the feeding of hydrogen in the reaction space, methanization on the product side of the graphite heat exchangers is conceivable.

This is because hydrogen is generally not converted completely in the reaction space and is usually also supplied to the reaction in excess, such that hydrogen is present in the product stream.

Downstream of the reaction space, hot hydrogen can diffuse into the graphite walls of the heat exchangers.

There may be corrosion therein, which, as well as the structural problems with the heat exchangers, principally causes the formation of methane which has to be removed again later in a complex manner from the offgas stream. Moreover, the corrosion can cause structural damage which necessitates early replacement of the heat exchangers.

It has been found that the coating, proposed in the prior art, of the corresponding surfaces with material which reacts only partly with hot hydrogen, if at all, for example silicon carbide, is too complex and uneconomic.

Post-compressed graphite types have been found to be unsuitable since they are also attacked by hydrogen.

Impregnated graphite types are gas-tight but can be used only up to temperatures of up to 200° C. and are thus likewise unsuitable.

A preferred embodiment of the process envisages establishing a diffusion volume flow of silicon tetrachloride from the reactant side to the product side.

As a result of this, the porous graphite is completely permeated by silicon tetrachloride, which prevents hydrogen from penetrating into the graphite on the product side and being able to attack it by methanization.

The diffusion volume flow has to be set such that it is sufficient to keep the hydrogen away from the graphite.

However, it must not be too high either because too much silicon tetrachloride otherwise flows from the reactant side to the product side and thus the selectivity of the conversion reaction is reduced.

The diffusion volume flow can be established on the basis of a particular heat exchanger geometry through the pressure differential between the reactant side and the product side, and through the selection of a graphite type with a certain porosity.

Preferably, the size of the diffusion volume flow is selected such that a minimal interface layer of silicon tetrachloride forms on the product side, which keeps the hydrogen in the product stream away even from the graphite surface.

Silicon carbide-coated graphite can be disadvantageous since the silicon carbide layer seals the graphite in such a way that no protective silicon tetrachloride diffusion stream can penetrate the graphite. Therefore, silicon carbide coatings are not preferred in this embodiment.

EXAMPLES

Comparative Example 1 (state of the art)

The comparative example used was a conventional reactor without an additional steel heat exchanger, corresponding to document DE 30 243 20 A1.

A gas mixture in the reactant stream consisting of 33 mol % of silicon tetrachloride and 67 mol % of hydrogen was used. The inlet temperature of the reactant gas stream was about 175° C.

The pressure was set to 6 bar and the temperature of the gas in the reactor space to 1000° C.

After the reaction, the product gas was analyzed in a gas chromatograph, and the proportions of trichlorosilane and silicon tetrachloride were determined. The temperature of the exiting product gas stream was about 350° C.

The relative selectivity is given by the molar proportion of trichlorosilane relative to silicon tetrachloride.

For the sake of simplicity, the relative selectivity achieved in the comparative example is defined as 100%.

Comparative Example 2 (state of the art)

In comparative example 2, the known apparatus from the previous comparative example 1 is used, and dichlorosilane is additionally mixed into the reactant stream in a molar ratio of 3% dichlorosilane to 97% silicon tetrachloride.

The relative selectivity is 115%, i.e. 15% higher than in the comparative example. This shows that the addition of dichlorosilane gives a positive effect with regard to the selectivity achieved. In the case of an increase in the molar ratio of dichlorosilane to 20% relative to 80% silicon tetrachloride, the relative selectivity was increased only slightly.

Example 3a

In this example, a reactor according to FIG. 1 was used.
For the heat exchanger unit WT1, isostatically pressed graphite was used.
The process was run analogously to comparative example 1, except that, in accordance with the invention, hydrogen and silicon tetrachloride were heated separately.

The hydrogen was brought to a temperature of 500° C. in the second heat exchanger and brought directly into the reaction zone, and silicon tetrachloride was preheated to about 920° C. in the first heat exchanger and then heated to 1350° C. with the aid of the electrical heating elements, before the two gases were mixed in the reaction zone. The mean temperature in the reaction zone was about 1000° C.

The relative selectivity of the reactor increased to 145%.

It was also found that the heaters, after the reactor was shut down, were still in impeccable condition. It was impossible to detect any effect of the methanization thereon.

Example 3b

Example 3b was conducted analogously to example 3a, except that the pressure differential between the reactant side and the product side of heat exchanger unit WT1 was varied within the range between 10 mbar and 1000 mbar by incorporating various throttles.

It has been found that the best results were achieved at a pressure differential between 50 mbar and 200 mbar with simultaneous minimal graphite wall thickness between the reactant and product sides of heat exchanger unit WT1 within the range of 4-30 mm. The best values were, however, achieved with a minimum wall thickness between 10 mm and 20 mm.

The inventors have recognized that the use of isostatically pressed graphite for the heat exchanger unit WT1 in combination with a defined pressure differential appears to be optimal.

It appears that the low porosity of the material permits buildup of a diffusion volume flow to protect the graphite, but nevertheless establishment of the volume flow at a sufficiently low level not to reduce the selectivity of the conversion reactor.

Distinctly reduced methanization of the heat exchanger unit WT1 was found. It was found that the internal surface area of the heat exchanger tubes on the product side was much smoother than in example 3a.

Example 4

In addition to example 3b, dichlorosilane was injected as a third reactant stream 13 in a molar ratio of 3% dichlorosilane to 97% silicon tetrachloride in a further central nozzle mounted at the base of the reaction zone. A corresponding apparatus with an additional central nozzle is shown schematically in FIG. 1.

The dichlorosilane stream injected had a temperature between 250° C. and 350° C.

No temperature correction of the preheated silicon tetrachloride stream in the heating zone was necessary.

A central nozzle is used for inflow of dichlorosilane.

The central nozzle for introduction of dichlorosilane had a diameter of 15 mm.

The relative selectivity increased further to 165% without any evident adverse effects in relation to structural problems.

The invention claimed is:

1. A process for hydrogenating chlorosilanes in a reactor, wherein at least two reactant gas streams are introduced separately from one another into a reaction zone, wherein a first reactant gas stream comprising silicon tetrachloride is conducted through a first heat exchanger unit in which it is heated and is then conducted through a heating unit which heats the first reactant gas stream to a first temperature before the first reactant gas stream reaches the reaction zone, and wherein a second reactant gas stream comprising hydrogen is heated by a second heat exchanger unit to a second temperature, wherein the first temperature is greater than the second temperature, and then introduced into the reaction zone, such that a mean gas temperature in the reaction zone is from 850° C. to 1300° C., and said at least two reactant gas streams react to give product gases comprising trichlorosilane and hydrogen chloride, wherein the product gases obtained in the reaction are conducted in a product gas stream through said at least two heat exchanger units and preheat the at least two reactant gas streams of the reaction by a countercurrent principle, wherein the product gas stream passes first through the first heat exchanger unit and then through the second heat exchanger unit.

2. The process as claimed in claim 1, wherein dichlorosilane is additionally introduced into a reaction space with a molar ratio based on silicon tetrachloride of 0.5% to 20%.

3. The process as claimed in claim 1, wherein the first heat exchanger unit comprises graphite, silicon carbide, silicon carbide-coated graphite, silicon nitride, CFC or silicon carbide-coated CFC, and the second heat exchanger unit comprises steel or stainless steel.

4. The process as claimed in claim 1, wherein a pressure of the first reactant gas stream in the first heat exchanger unit is 10 to 1000 mbar higher than the pressure of the product gas stream as it flows through the first heat exchanger unit.

5. The process as claimed in claim 2, wherein the first heat exchanger unit comprises graphite, silicon carbide, silicon carbide-coated graphite, silicon nitride, CFC or silicon carbide-coated CFC, and the second heat exchanger unit comprises steel or stainless steel.

6. The process as claimed in claim 5, wherein a pressure of the first reactant gas stream in the first heat exchanger unit is 10 to 1000 mbar higher than the pressure of the product gas stream as it flows through the first heat exchanger unit.

* * * * *